(12) United States Patent
Patadia et al.

(10) Patent No.: US 8,767,950 B2
(45) Date of Patent: Jul. 1, 2014

(54) SCALABLE AND FLEXIBLE PROCESSING OF DIGIT MAPS AND DIAL STRINGS

(75) Inventors: Amit B. Patadia, Plano, TX (US); Vamshi K. Gillipalli, Irving, TX (US); Peter J. Swamidas, Irving, TX (US); Vivek Pachaiyappan, Little Elm, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1497 days.

(21) Appl. No.: 11/960,374

(22) Filed: Dec. 19, 2007

(65) Prior Publication Data

US 2009/0161860 A1  Jun. 25, 2009

(51) Int. Cl.
*H04M 1/00*  (2006.01)
*H04M 3/00*  (2006.01)
*H04M 7/00*  (2006.01)

(52) U.S. Cl.
CPC ................................ *H04M 7/0075* (2013.01)
USPC .................. 379/355.07; 379/355.09; 379/456

(58) Field of Classification Search
CPC ..................................................... H04M 7/0075
USPC ................ 379/352–371, 355.07, 355.09, 456
See application file for complete search history.

(56) References Cited

U.S. PATENT DOCUMENTS

| 6,275,574 B1* | 8/2001 | Oran | 379/201.01 |
| 2008/0175370 A1* | 7/2008 | Elharrar | 379/221.14 |

* cited by examiner

*Primary Examiner* — Alexander Jamal

(57) ABSTRACT

An exemplary system and method are directed to processing dial strings. A dial plan may be parsed into a plurality of expressions, each including at least one expression element. A rule associated the at least one expression element may be identified and added to an array of a finite state machine. Upon receiving a digit input, a match result indicating whether the digit input matched a corresponding expression element of each expression is determined based on the applicable rule. Expressions may be removed from consideration based on the match result. Digit inputs may continue to be received and match results may be determined based on successive expressions until either a match is determined or no further expressions are available for consideration. The match status may be reported based on the match result.

22 Claims, 12 Drawing Sheets

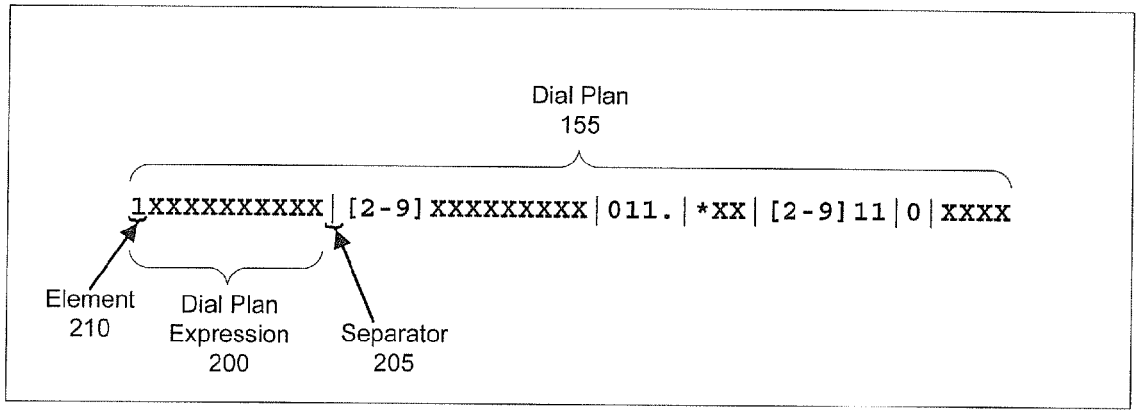
FIG. 2A
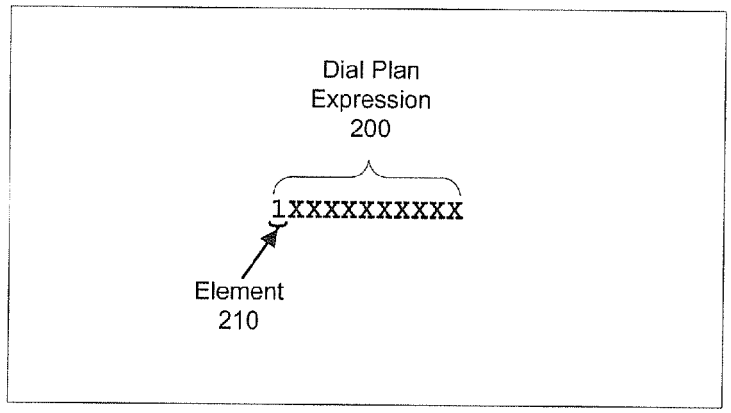
FIG. 2B
| Expression | Dial Plan Expression |
|---|---|
| 1 | 1XXXXXXXXXX |
| 2 | [2-9]XXXXXXXXX |
| 3 | 011. |
| 4 | *XX |
| 5 | [2-9]11 |
| 6 | 0 |
| 7 | XXXX |
FIG. 2C

SCALABLE AND FLEXIBLE PROCESSING OF DIGIT MAPS AND DIAL STRINGS

BACKGROUND INFORMATION

In many telephone systems, a telephone device associated with a user wishing to place a call collects digits entered by the user and compares those digits against a dial plan to determine if a complete and valid phone number has been dialed. In these systems the more digits a user types into a telephone the slower the comparison may become. Further, the more complicated the dial plan the more slowly the digits validation occurs. Such a slowdown in validation may be especially noticeable given today's complicated telephone systems, combined with the usage of telephone devices with low processing power such as basic cellular telephones.

BRIEF DESCRIPTION OF THE DRAWINGS

FIG. 2A illustrates an exemplary dial plan, specified as a regular expression.

FIG. 2B illustrates an exemplary dial plan expression.

FIG. 2C illustrates an exemplary list of dial plan expressions parsed from a dial plan.

DETAILED DESCRIPTION

Figure 1:
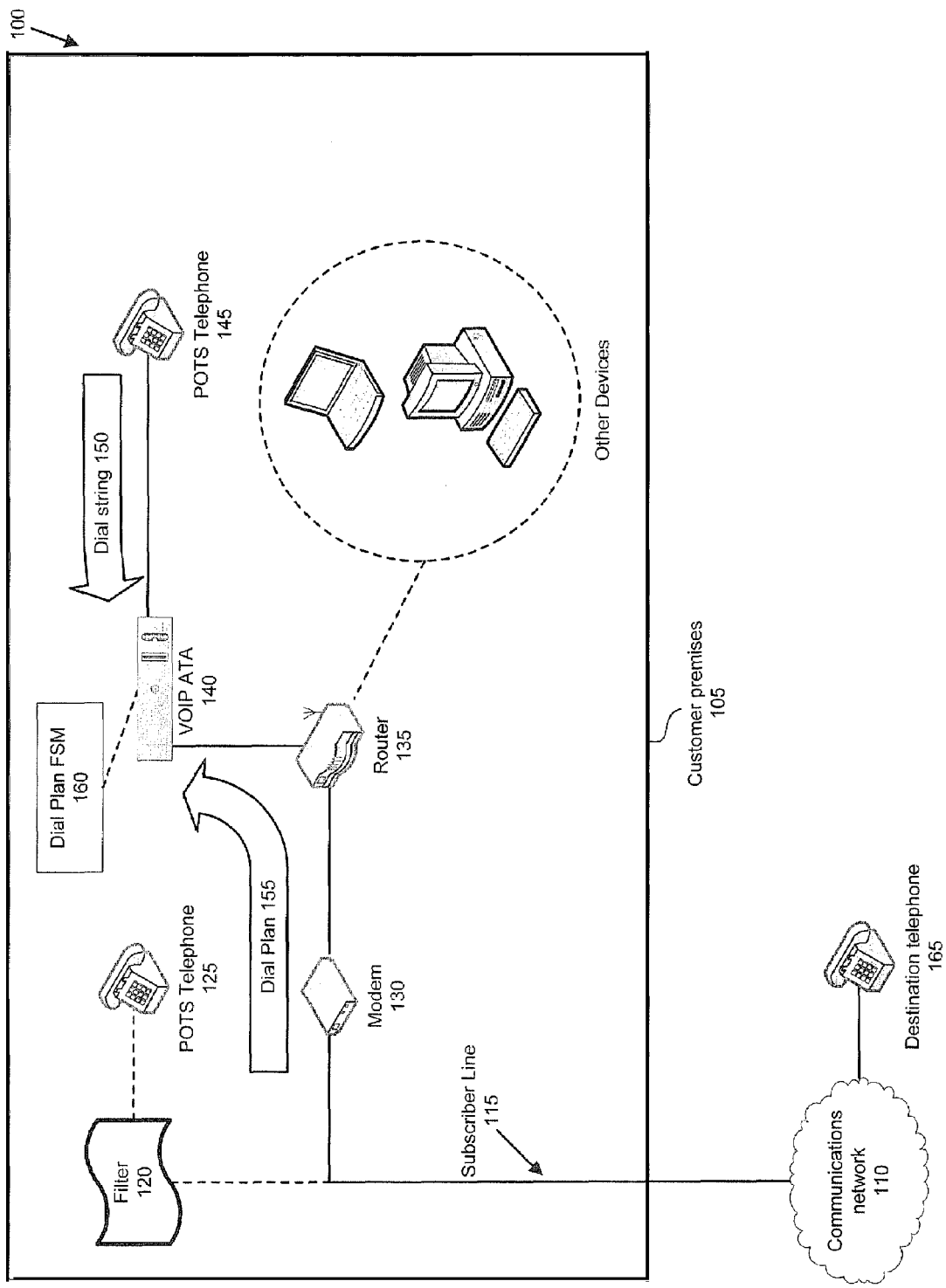
FIG. 1 illustrates an exemplary communications system for creating and using a dial plan finite state machine, according to one illustrative approach.

FIG. 1 illustrates an exemplary communications system (system) 100 for creating and using a dial plan finite state machine. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

As illustrated in FIG. 1, system 100 includes a customer premises 105. A customer premises 105 may include one or more physical structures (e.g., a residential or business building) having access to at least one communication service (e.g., public switched telephone network (PSTN), Internet access, and/or voice over IP (VOIP) services). A phone customer, such as an individual, a business, or other entity, may then use the resources of the customer premises 105.

A communications network 110 may provide communications services, including packet-switched network services (e.g., Internet access and/or VOIP communication services) to at least one device (e.g. telephone, "softphone," pager, computers, Set Top Box (STB), etc.), including, but not limited to, at least one device located in at least one customer premises 105. Each device on the communications network 110 may have its own unique device identifier (e.g. telephone number, Common Language Location Identifier (CLLI) code, Internet protocol (IP) address, input string, etc.) which may be used to indicate, reference, or selectively connect to a particular device on the communications network 110.

A communications network 110 may provide the ability for devices on the communications network 110 to selectively connect to other devices on the communications network 110. For example, a device may request through the communications network 110 to connect to another device, based on a device identifier for the requested device.

A subscriber line 115 may be used to connect the communications network 110 to a customer premises 105, according to one exemplary approach. The subscriber line 115 (e.g. any suitable transmission medium or media, including exterior copper, fiber optic wiring or a radio frequency signal), may thus make communication services available to customer premises 105.

In some examples, but by no means required, PSTN communication service signals may be propagated within customer premises 105 using any suitable medium or media, including for instance, subscriber line 115 or interior copper wiring. In these examples, a PSTN communication service may extend into customer premises 105, and subscriber line 115 may thus represent a segment of the PSTN communication service extending into customer premises 105. Further, a filter 120 may be connected to subscriber line 115, serving to isolate PSTN communication service signals from other potential signals on subscriber line 115. Thus, filter 120 may permit a plain old telephone system (POTS) telephone 125 to connect to subscriber line 115 without, for example, interference from other communications services carried by subscriber line 115, such as packet-switched communications including Internet access, and/or VOIP communication services.

A modem 130 is a device (e.g. a Digital Subscriber Line (DSL) modem or cable modem) that makes transmission of data possible to or from a communications device, such as a VOIP analog telephone adaptor (ATA) 140 devices discussed below. The modem 130 may be directly connected to subscriber line 115. For example, DSL services may be provided over a subscriber line 115 such that a device may communicate over a DSL communications network 110. In these examples, modem 130 may be a DSL modem.

A router 135 is a device that handles message transfers between communications devices. Such communications devices include, for example, a VOIP ATA 140, and other devices such as desktop computers, laptop, communication interfaces with STBs, and the like. The router 135 may optionally be connected to the modem 130 in one exemplary approach, allowing for multiple devices to share the available communications services. In other examples, a VOIP ATA 140 may be connected to a modem 130 directly without a router 135, a router 135 may be connected to a subscriber line 115 directly without a modem 130, or a VOIP ATA 140 may be connected directly to a subscriber line 115 without either a router 135 or a modem 130.

As mentioned above, customer premises 105 may include a VOIP ATA 140, e.g. (e.g., a VoiceWing® ATA provided by Verizon Communications Inc. of New York, N.Y.). The VOIP ATA 140 may be connected to a communications network 110 either directly or indirectly, and interfaces a POTS telephone 145 with a VOIP communications service. In many configurations, a standard POTS telephone 145 is connected to the VOIP ATA 140 to initiate and receive telephone calls. The POTS telephone 145 generally plugs directly into the VOIP ATA 140 rather than to the PSTN such that the VOIP service can be accessed using the POTS telephone 145. Accordingly, a subscriber to a VOIP telephone service may optionally, but is not required to subscribe to a PSTN telephone service.

In many examples, the VOIP ATA 140 is a computing device, including a processor, and storage. In general, a processor (e.g., a microprocessor) receives instructions, e.g., from a memory, a computer-readable medium, etc., and executes these instructions, thereby performing one or more processes, including one or more of the processes described herein. Such instructions may be stored and transmitted using a variety of known computer-readable media. For example, the VOIP ATA 140 may process VOIP signals from communications network 110 into signals that can be received by the POTS telephone 145, as well as process signals from the POTS telephone 145 into VOIP signals for use on communications network 110. As another example, the VOIP ATA 140 may process input or other requests sent from the POTS telephone 145, such as input of a device identifier to connect to on a communications network 110.

In addition, while FIG. 1 provides illustrative examples of consumer premises 105, further examples may include other configurations of hardware components. For example, filters 120, modems 130, routers 135, and VOIP ATAs 140 at consumer premises 105 may be configured as one or more devices. For instance, any combination of modem 130, router 135, and VOIP ATA 140 may be implemented in a single device. In some examples, modem 130, router 135, and VOIP ATA 140 may be implemented as computer-readable instructions (e.g., software) on one or more computing devices (e.g., personal computer) located at consumer premises 105.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory (DRAM), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

As stated above, VOIP ATA 140 interfaces a POTS telephone 145 with a VOIP communication service, for example, to initiate and receive telephone calls over a VOIP communication service. As is known, a communications network, such as to which a POTS telephone 145 typically connects, includes handling of both signaling information as well as voice or data information. Signaling is used, among other things, for the initiation of a telephone call. For example, signaling may include a signal to indicate the initiation of a request to connect to a device, or that the device is ready for input (e.g., a dial tone), or that an error occurred (e.g. a reorder tone or error message). Signaling may further include input of a device identifier (e.g. dialed digits of a telephone number).

In order to initiate a telephone call, a sequence of digits is typically input (e.g. by a user, by an automated dialing device, by a computer, etc.). This sequence of digits is known as a dial string 150. The VOIP ATA 140 may store the dial string 150 as dialed in order to validate it and to send it on to the communications network 110 via subscriber line 115. The dial string 150 may include at least one digit, where the digits include not only the numerals zero through nine, but also symbols including the * symbol, but typically not the # symbol. The "#" pound symbol is typically used in VoIP ATA's for making a forced dial out when there is a dial string match without waiting for any timer expiry. For example:

a. User dials digit "4" (Partial match, wait for expiration of Inter Digit Timer)

b. User dials digit "1" (digit dialed: "41", Partial match, wait for expiration of Inter Digit Timer)

c. User dials digit "1" (digit dialed: "411", Complete match and Partial match with another expression, wait for expiration of Critical Digit Timer)

d. User dials digit "1" (digit dialed: "411#", Immediately dial out)

Communications network 110 may use input requirements, such as establishing a dial plan 155, to describe the format of valid device identifiers on the communications network 110. A dial plan 155 is a definition of input requirements that may be used by or received from a communications network 110 to determine if a complete and valid telephone number has been dialed. In many phone systems, a device (e.g. PSTN central office, VOIP ATA 140, etc.) collects a dial string 150 and compares it against the dial plan 155 to determine if a complete and valid phone number has been dialed. As each new digit is collected and added to the end of a dial string 150, the dial string 150 is again compared to the dial plan 155. Using the dial plan 155, the telephone system may determine when the dial string 150 has been completely dialed and is ready for further processing. On the other hand, if the dial string 150 fails to match the dial plan 155, the communications system may identify the number as invalid (e.g. play a reorder tone, display or play an error message, forward the call to an operator or other device, etc.).

The VOIP ATA 140 may store the current dial plan 155. The current dial plan 155 may for example be received upon startup of the VOIP ATA 140, requested from the communications network 110, be built into the VOIP ATA 140, or otherwise become available to the VOIP ATA 140.

A dial plan finite state machine (FSM) 160 may be created from a dial plan 155, and may be used to efficiently determine whether a dial string 150 matches the dial plan 155. The dial plan FSM 160 accomplishes this by analyzing only each successive digit of a dial string 150 as it is dialed, without reanalyzing the entire dial string 150 already dialed. A VOIP ATA 140 may create the dial plan FSM 160 from a dial plan 155, and may store the dial plan FSM 160 for use in validating at least one dial string 150. The dial plan FSM 160 may continue to be used to validate dial strings 150 until, for example, a new dial plan 155 is received.

As mentioned above, communications network 110 may connect to other devices either inside or outside of the customer premises 105 that are identified by device identifiers. A destination telephone 165 is one such device.

FIG. 2A illustrates an exemplary dial plan 155, specified as a regular expression. As is known, regular expressions are strings used to describe textual data. Regular expressions are commonly used to search for particular patterns within a block of text, for example, words beginning with the letter a. Regular expressions may also be used for validation, such as to ensure that an email address is entered in the proper form. For communications systems (e.g. PSTN, VOIP, etc.), it is known in the art to use regular expressions in a dial plan 155 to validate that the dial string 150 is entered in a proper format.

A regular expression may be composed of a string of alphanumeric characters. Each character or set of characters in a valid regular expression dial plan 155 string is an element 210 of the dial plan expression 200 or a separator 205 "|" between dial plan expressions 200.

FIG. 2B illustrates an exemplary dial plan expression 200. A dial plan expression is an input requirement specified by a dial plan 155. A dial plan 155 may be composed of at least one dial plan expression 200. Multiple dial plan expressions 200 may be separated by separator 205 items. A dial plan 155 may contain at least one dial plan expression 200, and typically a VOIP ATA 140 is configured to be capable of handling a dial plan 155 of at least 1024 characters. A valid dial plan 155 may also contain as little as one dial plan expression 200. Thus, dial plan expression 200 is also a valid dial plan 155.

An element 210 of a dial plan expression 200 represents a certain specific digit or digits in a dial string 150 to match. Thus, each element 210 of a dial plan expression 200 may be a matching requirement of an input requirement.

An element 210 within the regular expression may be represented as the digit itself, such as a 0 element 210 may be used to indicate a 0 in the dial string 150, and a 1 element 210 may be used to indicate a 1 element 210 in the dial string 150.

The X element 210 may be used to match any one numeric digit from 0 through 9, namely any one of 0, 1, 2, 3, 4, 5, 6, 7, 8, or 9.

A range of digits may be specified as an element 210, for example through the use of brackets and a dash in the form, [digit-digit]. The first digit is typically a lower end of a range, and the second digit is typically the high end of the range. For example, the range [2-9] indicates that any one of the digits 2, 3, 4, 5, 6, 7, 8, or 9 would match. Ranges may be combined with other digits as well, and for example the element 210 [235-8*] may match any one of the characters 2, 3, 5, 6, 7, 8, or *.

An element 210 may match multiple consecutive digits of dial string 150 in addition to matching only one digit. For example, a "." element 210 may be used to indicate a match if zero or more of the preceding element 210 are found. For example, the dial plan expression 200 of 91 would match the dial strings 150 of 9, 91, 911, 9111, 91111, etc. When a match occurs with a "." element, the match is said to be a dot match.

In summary, an example of individual regular expression elements 210 for use in a dial plan expression 200 may be as described in Table 1:

TABLE 1

| Element | Meaning |
| --- | --- |
| 0 1 2 3 4 5 6 7 8 9 * | A specific digit |
| [digit-digit] | A Range of digits |

TABLE 1-continued

| Element | Meaning |
| --- | --- |
| [digit digit] | Any of a set of digits |
| X | Any digit |
| . | Zero or more of the previous digit |
| \| | Separate alternate dial plan expressions |

Elements 210 may be combined in various ways to allow for the matching of the desired dial string 150. For example, a dial plan expression 200 of [2-9]11 will match dial strings 150 of 411 and 911, but not dial strings 150 of 123 or 412. Moreover, elements 210 may be combined with the "|" character as a separator 205 to indicate multiple input requirements, or multiple possible ways to form a match. For example, a dial plan expression 200 of [2-9]11|0 will match dial strings 150 of 411, 911, and 0, but not dial strings 150 of 123, 412, or *. Thus, a dial plan may includes at least one input requirement (e.g. dial plan expression 200), and each input requirement may include at least one matching requirement (e.g., elements 210 of the regular expression).

Generally, if the digits of the dial string 150 meet the requirements of each element 210 of a dial plan expression 200, then the dial string 150 may be a full match. If the digits in the dial string 150 do not currently meet all the requirements of each element 210, but may meet the requirements if more digits are dialed, then the dial string 150 may be a partial match. If the digits in the dial string 150 meet the requirement of each element 210, including a "." element, then the dial string 150 may be a dot match. However, if the digits in the dial string 150 fail to meet the requirements of each element 210, and no additional digits added to the dial string 150 will cause the dial string 150 to match, then the dial string 150 may be an invalid match.

FIG. 2C illustrates an exemplary list of dial plan expressions 200 parsed from a dial plan 155. In this example, the list of dial plan expressions 200 is created from the sample dial plan 155 as illustrated in FIG. 2A, and includes seven different dial plan expressions 200.

Figure 2D:
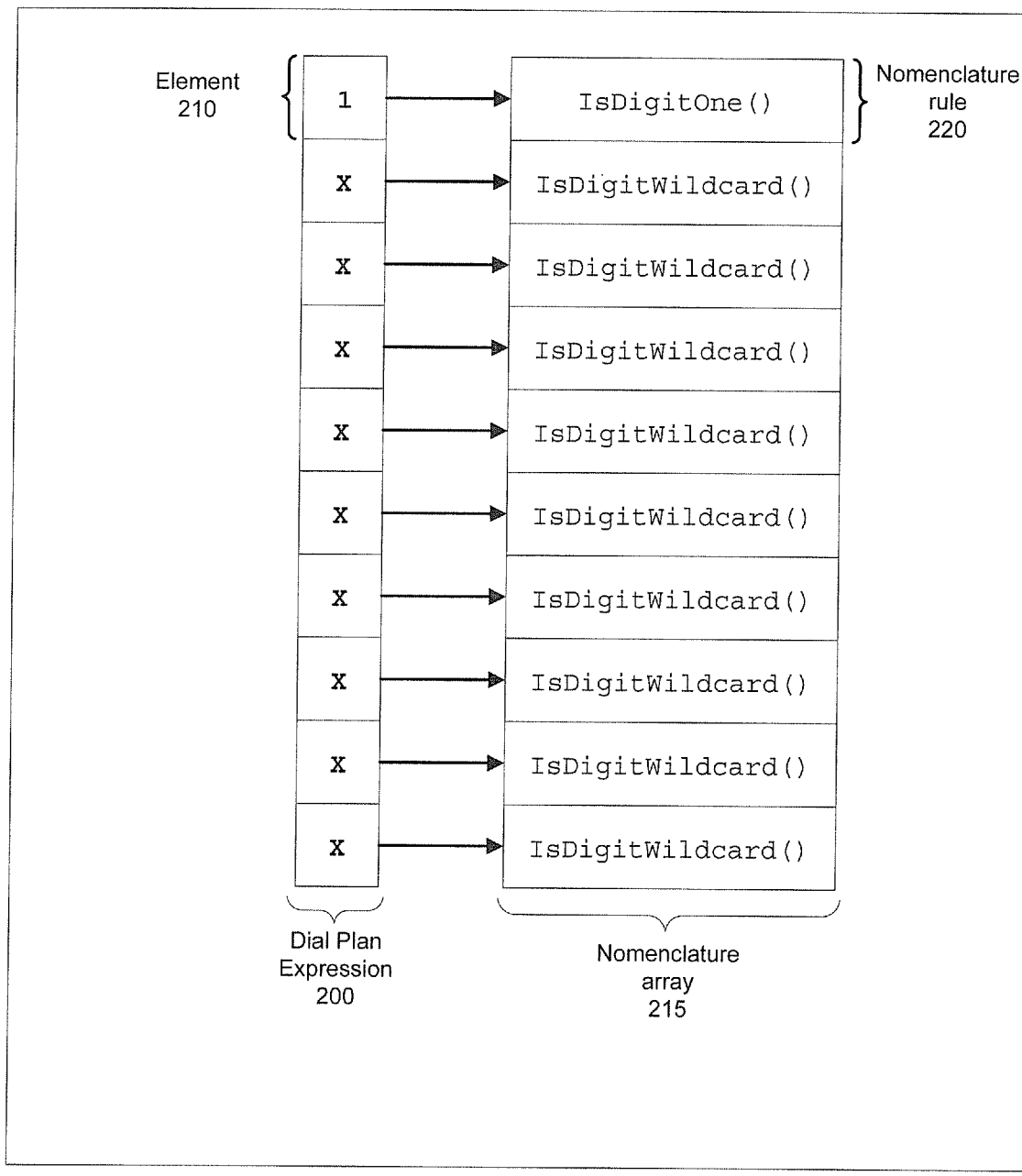
FIG. 2D illustrates an exemplary dial plan expression with associated nomenclature array.
Figure 3:
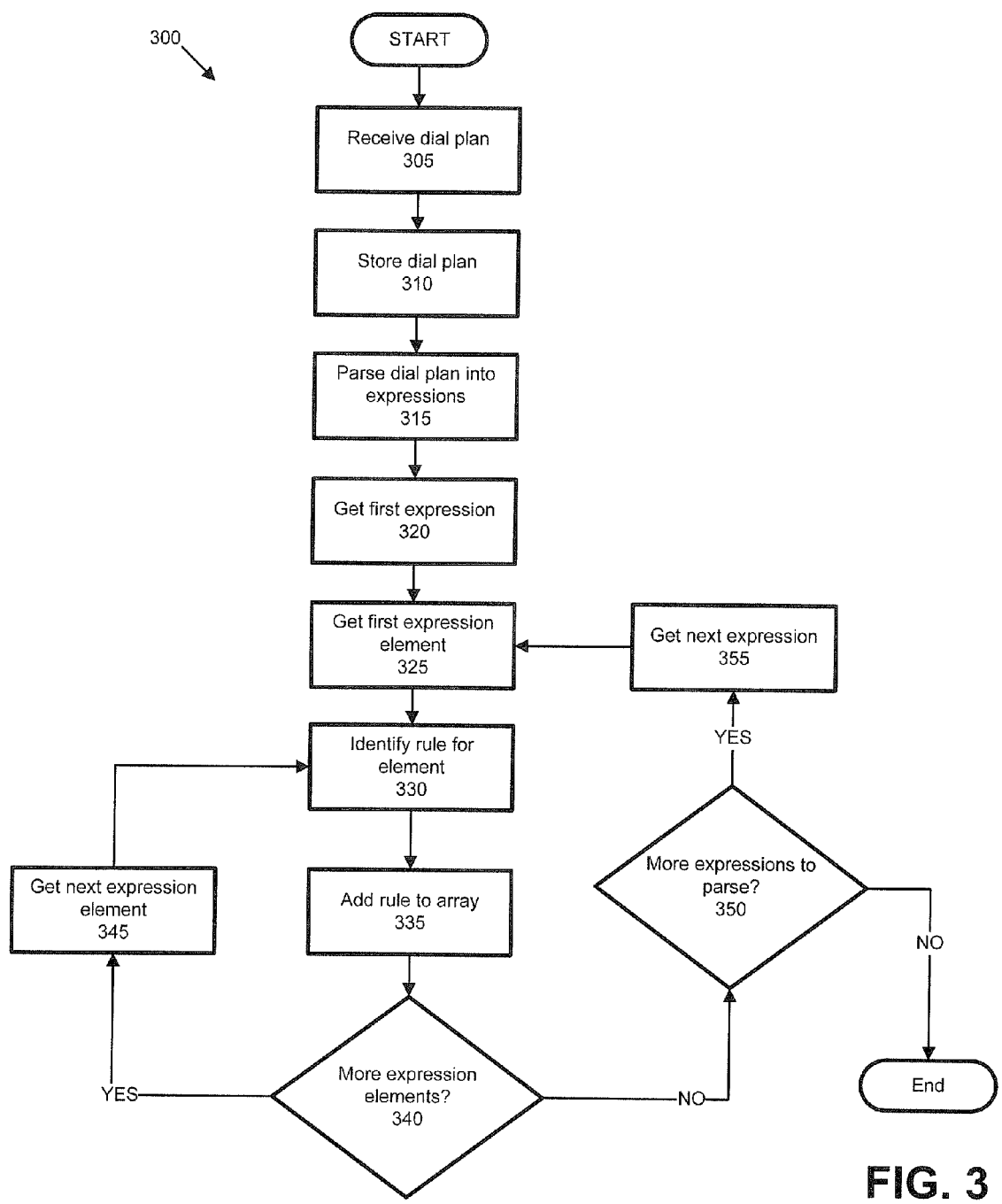
FIG. 3 illustrates an exemplary process for creating a dial plan finite state machine.

FIG. 2D illustrates an exemplary dial plan expression 200 with an associated nomenclature array 215. Once the list of dial plan expressions has been parsed from the dial plan 155, for example as illustrated in FIG. 3, a second pass is performed, wherein each individual dial plan expression 200 (e.g. 1XXXXXXXXXX) may be broken down into elements 210 (e.g. 1, X). In the second pass, each individual element 210 may be associated with a nomenclature rule 220. A nomenclature rule 220 is a definition (e.g. computer executable code) that may be used to represent the syntax of the element 210. Thus, the nomenclature array is an association of matching requirements (e.g. elements 210 of a dial plan expression 200) with corresponding matching rules (e.g. nomenclature rules 220).

Each nomenclature rule 220 is associated, for example, by adding a corresponding entry for an element 210 to a nomenclature array 215 data structure (e.g. a function pointer array, a C++ Standard Template Library vector class, etc.). In many examples, the nomenclature array 215 may be indexed by element 210 number or element 210 position in the dial plan expression 200. In this way, the $N^{th}$ nomenclature rules of each nomenclature array may be accessed. For example, when comparing the first digit of the dial string, the $1^{st}$ nomenclature rule of each nomenclature array would be accessed.

Each nomenclature rule 220 of the nomenclature array 215 may take a dial string 150 digit as input, and return a value indicating whether the digit matches the nomenclature rule 220. For example, a True value may be returned if the digit falls within the rule, otherwise a False value may be returned. Further, each nomenclature rule 220 may be represented by software code (e.g. a function written in the C++ programming language), to identify in software if a digit falls within a nomenclature rule 220.

Nomenclature rules 220 are defined for each of the various elements 210 described above in Table 1 that may be included in the dial plan expression 200, for example as described in Table 2.

TABLE 2

| Example Elements | Corresponding Nomenclature rule | Rule meaning |
| --- | --- | --- |
| 1 2 3 4 5 6 7 8 9 0 | IsDigit( ) | Function which identifies if a digit entered is a numeric digit |
| [2-9] | IsRange( ) | Function which indentifies if the digit entered is a digit in range |
| X | IsWildCardSymbol( ) | Function which identifies if the digit entered is a wild card symbol |
| . | IsWildCardDotSymbol( ) | Function which identifies if digit entered is a wild card dot symbol |
| [2, 5] | IsDigitInSet( ) | Function which identifies if the digit entered is a valid digit in set |
| 1 | IsDigitOne( ) | Function which identifies if digit entered is a numeric one |
| 0 | IsDigitZero( ) | Function which identifies if digit entered is a numeric zero |
| * | IsDigitStar( ) | Function which identifies if digit entered is a star code |

Based on the definitions of the nomenclature rules, elements 210 of a dial plan expression 200 may be mapped to their associated nomenclature rules 220. In this way, each matching requirement of the input requirement may be associated with a corresponding matching rule.

For example, a digit nomenclature rule 220 may be used for cases where the element 210 identifies a specific digit to match, such as 0, 1, or *. As illustrated in FIG. 2D, as the first element 210 of the dial plan expression 200 is a 1, the mapped nomenclature rule is IsDigitOne( ).

A range nomenclature rule 210 may be used for cases where element 210 identifies any digit within a particular range of values. Thus, a range nomenclature rule 210 may be used to handle elements 210 such as [2-9] or [235-8*].

A wildcard nomenclature rule 220 may be used for cases where element 210 may identify any single digit to match. Thus, a wildcard nomenclature rule 220 may be used to handle an X element 210. As illustrated in FIG. 2D, as the second element 210 of the dial plan expression 200 is an X, the mapped nomenclature rule is IsDigitWildcard( ).

A dot wildcard nomenclature rule 220 may be used for cases where the element 210 may identify zero or more of the preceding element 210 to match. Thus, a dot wildcard nomenclature rule 220 may be used to handle the element 210.

Each dial plan expression 200 is associated with its own nomenclature array 215. As each nomenclature rule 220 is identified, it is added to a corresponding location of the associated array 215. Thus, once the entire dial plan expression 200 has been parsed, each element of the array 215 may correspond to an identified nomenclature rule 220 for each element 210 of the dial plan expression 200.

Once a nomenclature array 215 has been filled out for each dial plan expression 200, the nomenclature array 215 is then linked into a dial plan FSM 160.

Figure 2E:
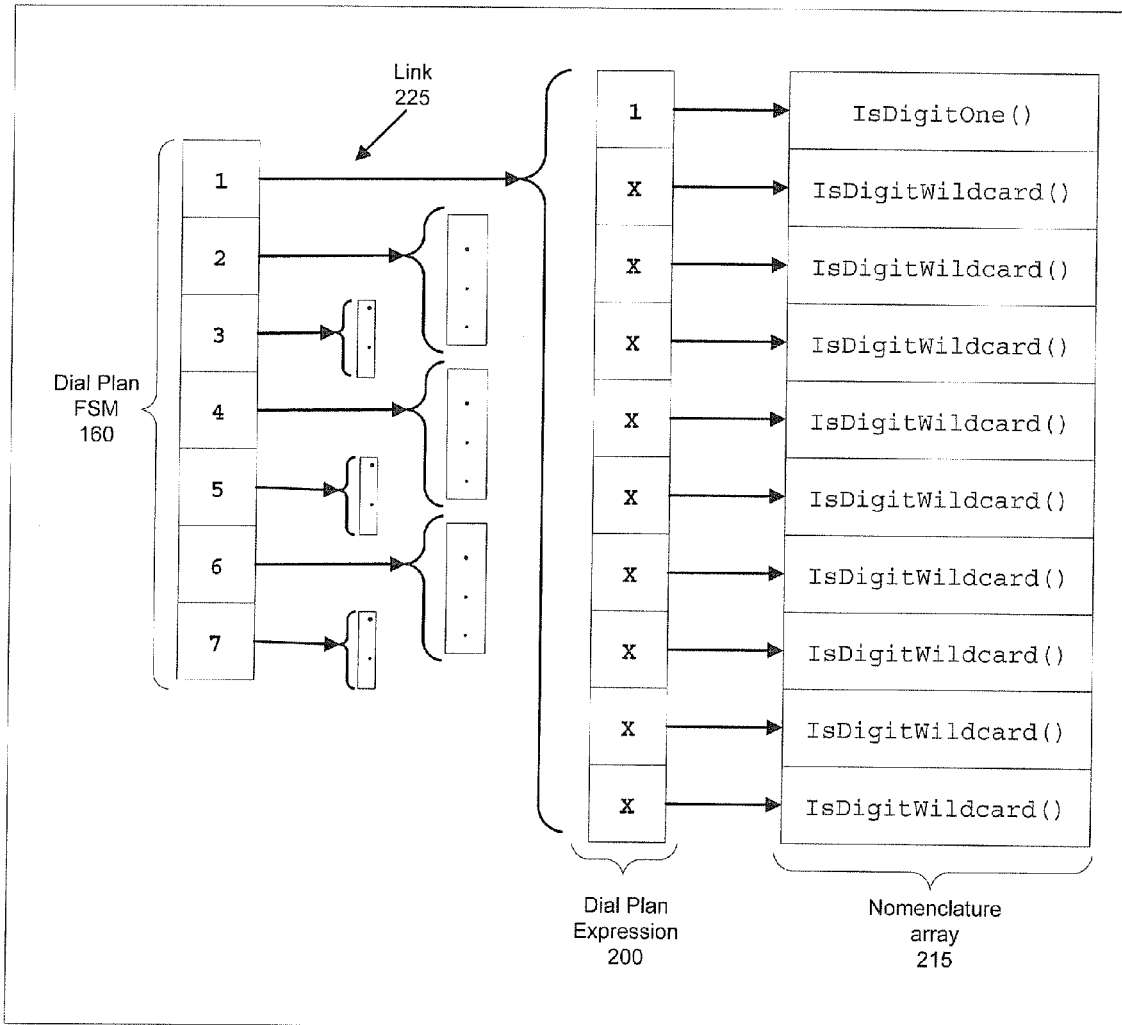
FIG. 2E illustrates an exemplary dial plan expression with associated nomenclature array, as included in a dial plan finite state machine.

FIG. 2E illustrates an exemplary dial plan expression 200 with associated nomenclature array 215, as linked into a dial plan finite state machine 160. A link 225 is used to associate or index a nomenclature array 215 with a dial plan finite state machine 160. In this example, the first dial plan expression with associated nomenclature array is linked to the first position of the dial plan FSM 160. Each nomenclature array 215 is indexed by corresponding dial plan expression 200.

Figure 2F:
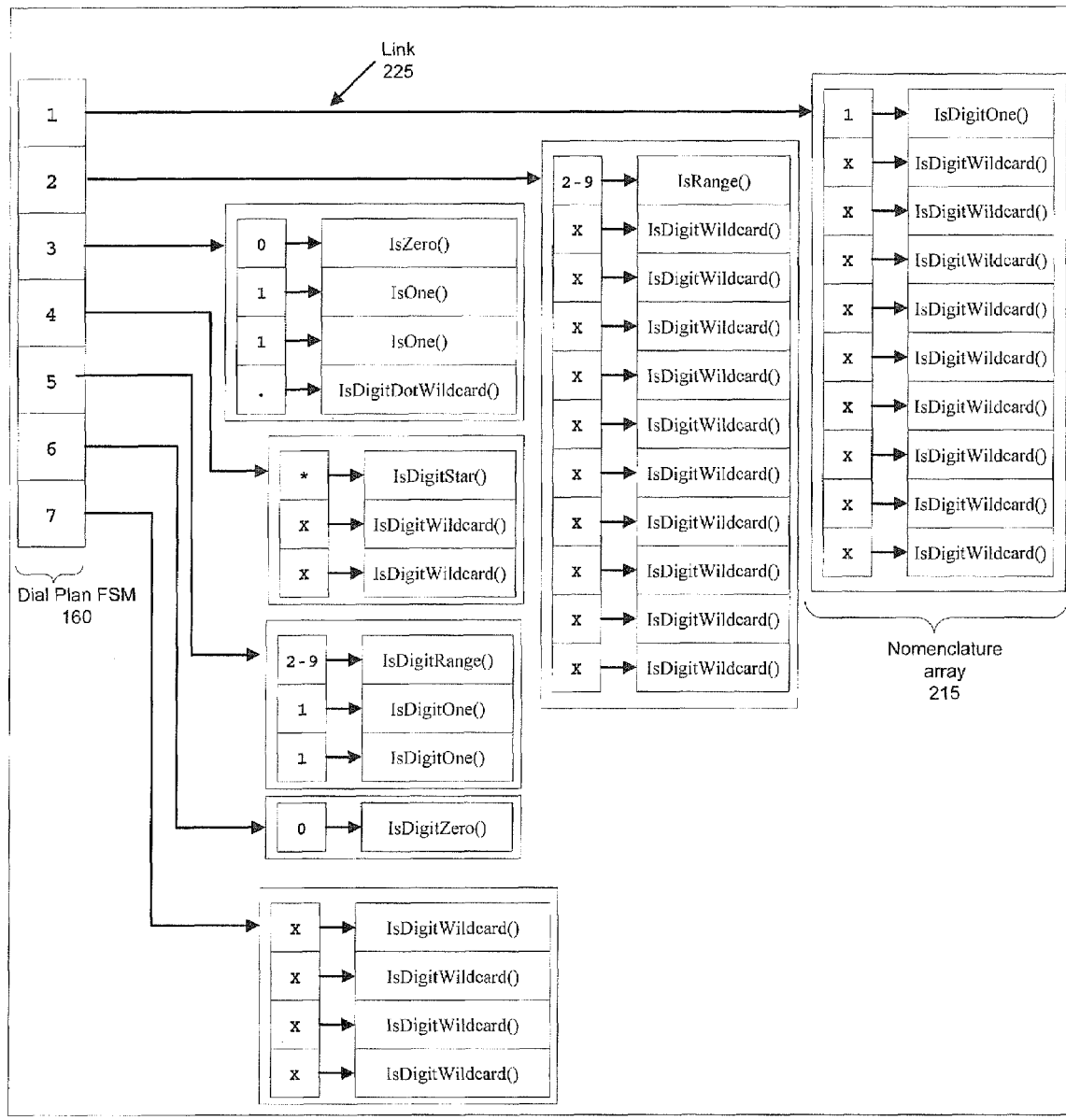
FIG. 2F illustrates an exemplary complete dial plan finite state machine.

FIG. 2F illustrates an exemplary complete dial plan FSM 160. As illustrated, the dial plan FSM 160 includes a nomenclature array 215 for each dial plan expression 200/Each nomenclature array is associated or indexed into the dial plan FSM 160 though use of link 225 elements. Once the dial plan FSM 160 is complete, it may then be made available for use by a device (e.g. VOIP ATA 140) for verifying a dial string 150.

FIG. 2O illustrates an exemplary dial plan finite state machine including NULL array elements. During the processing of a dial string 150, nomenclature arrays 210 that form a full match, a partial match or a dot match are retained as part of the dial plan FSM 160. However, nomenclature arrays 210 that are determined to be an invalid match are removed from the dial plan FSM 160. A null element 255 is associated with the dial plan FSM 160 in the place of the removed nomenclature array 210. In this way, only nomenclature arrays 210 that match the dial string 150 as dialed so far are retained for further comparison, improving performance. In this example, nomenclature arrays 210 corresponding to the first, third, fourth, and sixth dial plan expressions 200 are removed from the dial plan FSM 160.

FIG. 3 illustrates an exemplary process 300 for creating a dial plan FSM 160.

In step 305, a dial plan 155 in the form of a regular expression is received by a device on the customer premises 105, (e.g. VOIP ATA 140), for instance such as the dial plan 155 shown in FIG. 2A. In other examples, dial plan 155 may be requested by the VOIP ATA 140.

Next, in step 310, the dial plan 155 is stored in memory for later use. The dial plan 155 may be retained in the memory of the device (e.g. VOIP ATA 140) until a new dial plan 155 is made available.

Next, in step 315, a first pass of the dial plan 155 is performed to separate the dial plan 155 into individual dial plan expressions 200. For example, the "|" character may be used as a separator 205 between the dial plan expressions 200. As mentioned above, using the sample dial plan as illustrated in FIG. 2A, the individual dial plan expressions 200 are for example as illustrated in FIG. 2C.

Next, in step 320, a dial plan expression 200 is retrieved to perform the second pass. Using the example as illustrated in FIG. 2D, the first individual dial plan expression 200 to retrieve is 1XXXXXXXXXX.

Next, in step 325, a first element 210 of dial plan expression 200 is retrieved. Continuing with this example, the first dial plan expression 200 is 1XXXXXXXXXX, so therefore the first expression element 210 is 1.

Next, in step 330, an appropriate nomenclature rule 220 for the retrieved element 210 is identified. For example, for the element 210 of 1, the IsDigitOne( ) nomenclature rule 220 may be identified.

Next, in step 335, the identified nomenclature rule 220 is added to a nomenclature array 215. As shown in the example as illustrated by FIG. 2D, the nomenclature array 215 may be used to contain references to the nomenclature rules 220 (e.g. code elements such as function pointers, delegates, numeric values, etc.) corresponding to the elements 210 of the dial plan expression 200. The total number of elements of the nomenclature array 215 may be the same as the number of elements 210 in the dial plan expression 200. For example, a nomenclature array 215 for the dial plan expression 200 of 1XXXXXXXXX would contain ten nomenclature rules 220, because the dial plan expression 200 is composed often elements 210.

Next, in step 340, it is determined if there are any more elements 210 of the dial plan expression 200 to parse. If yes, then step 345 is executed next. Otherwise the nomenclature array 215 for this expression is completed and associated or indexed into the dial plan FSM 160. Next, step 350 is executed.

In step 345, the next element 210 is retrieved. In this manner, the nomenclature array 215 is filled out for each element 210 of the dial plan expression 200. Next, step 330 is executed.

As mentioned above, step 350 is executed once each element 210 of the dial plan expression 200 has been associated with a nomenclature rule 220 in the nomenclature array 215. In step 350, it is determined if there are any more dial plan expressions 220 to parse. If yes, then step 355 is executed next. Otherwise the process 300 ends.

In step 355, the next dial plan expression 200 is retrieved. Next, step 325 is executed. In this manner, a nomenclature array 215 may be filled out for each dial plan expression 200 in the dial plan 155, and then associated or indexed into the dial plan FSM 160.

Figure 4A:
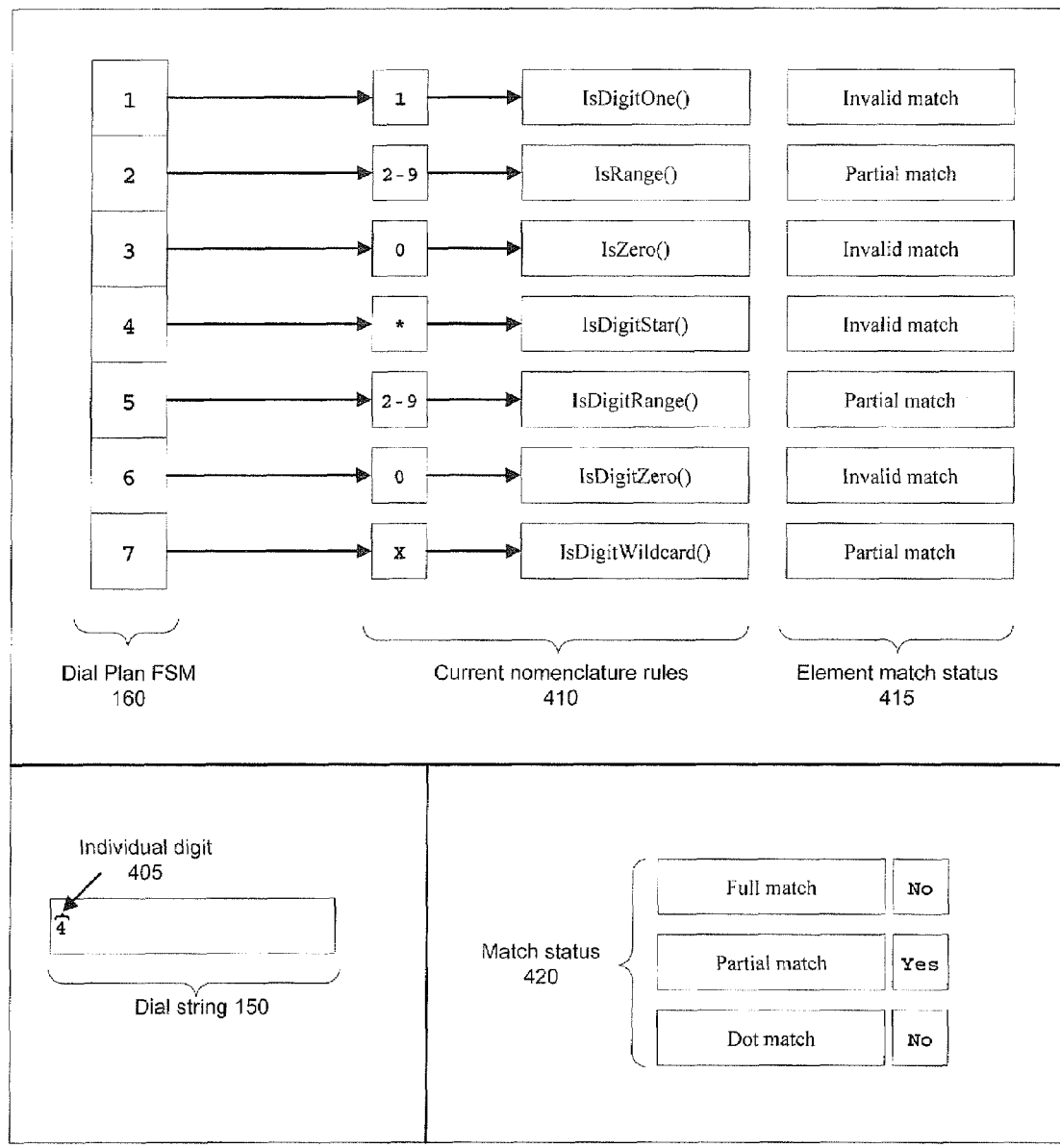
FIG. 4A illustrates an example evaluation of the first individual digit of a dial string for the sample dial plan finite state machine described in FIG. 2F.
Figure 4B:
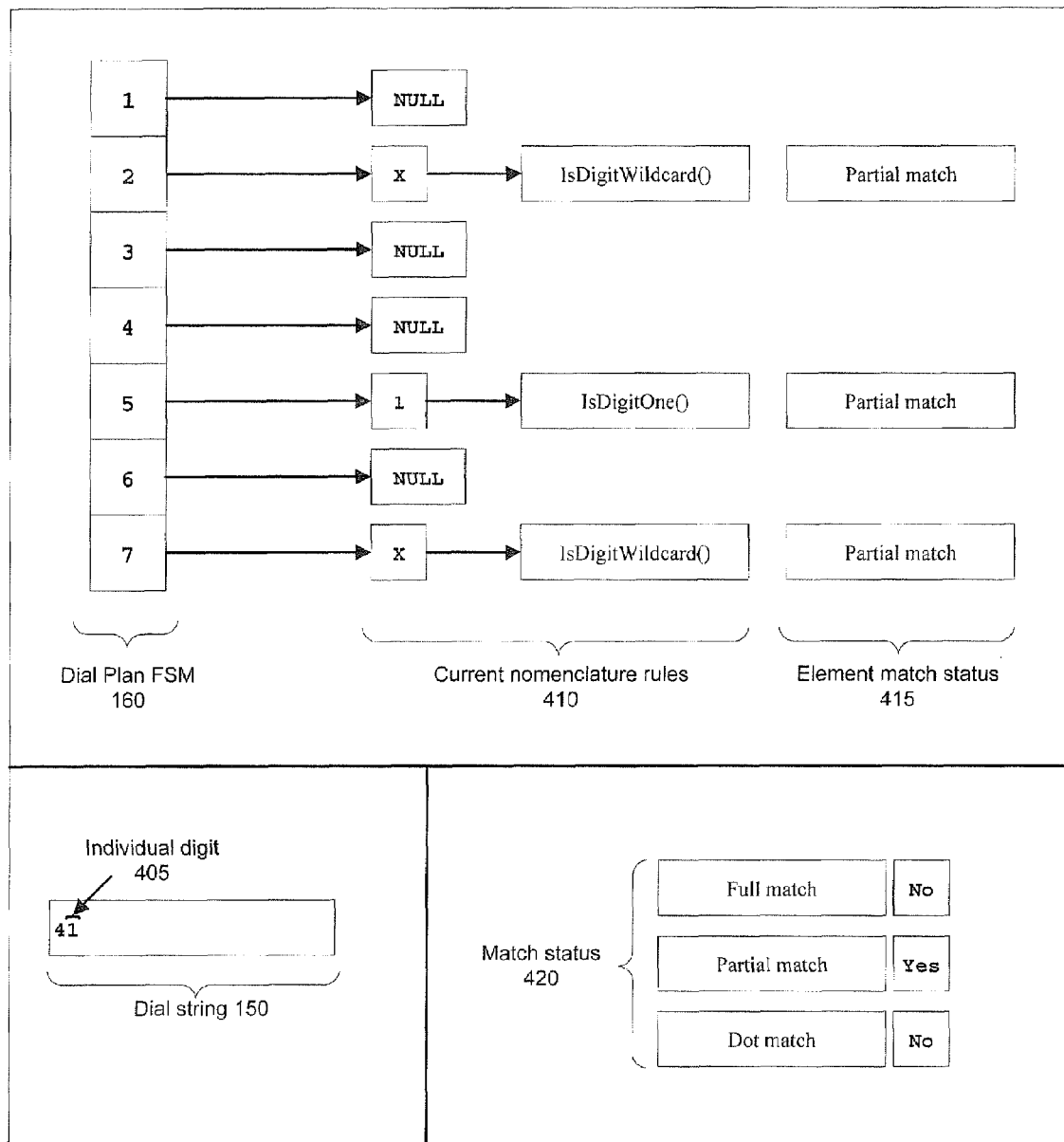
FIG. 4B illustrates an example evaluation of the second individual digit of a dial string, using the dial plan finite state machine described in FIG. 2F.
Figure 4C:
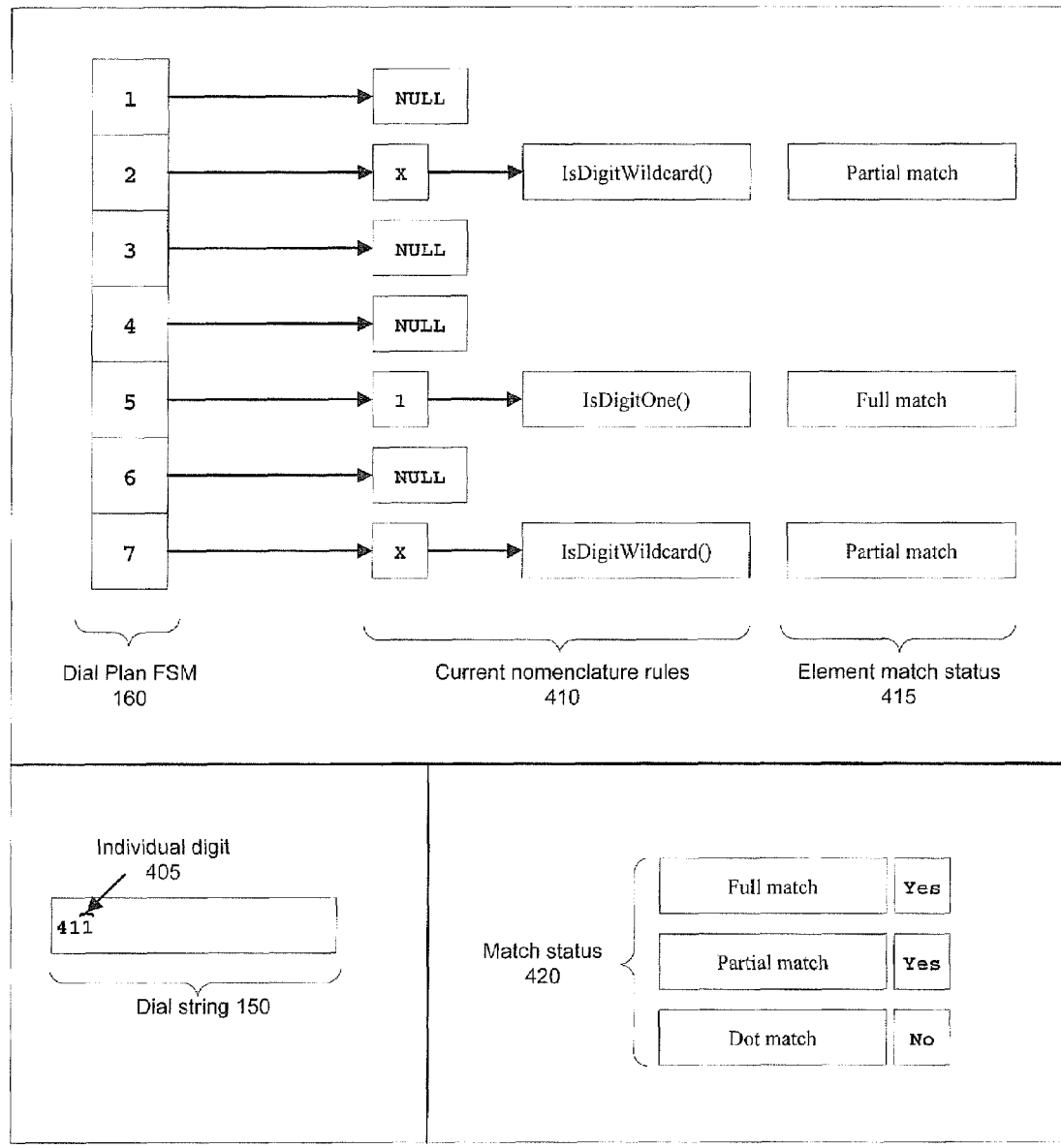
FIG. 4C illustrates the processing of a third individual digit of a dial string.

FIGS. 4A, 4B and 4C together illustrate an example evaluation of the dial string 150 of 411, using the sample Dial plan FSM 160 illustrated in FIG. 2F. Generally, each individual digit 405 may be evaluated for each of the nomenclature arrays 210 in the Dial plan FSM 160 to determine whether the dial string 150 is a complete and valid phone number. Each individual digit 405 may be evaluated in the Dial plan FSM 160 according to its location in the dial string 150. The current individual digit 405 may be compared against current nomenclature rule 410 for each of nomenclature arrays 210.

FIG. 4A illustrates an example evaluation of the first individual digit 405 of a dial string 150 for the sample dial plan finite state machine 160, as illustrated in FIG. 2F. An individual digit 405 is a digit of the dial string 150 being compared against the dial plan FSM 160. A current nomenclature rule 410 is a nomenclature rule 220 corresponding to the current location in the dial string 155. In this example, each current nomenclature rule 410 corresponds to the first nomenclature rule 220 for each nomenclature array 210. The first individual digit 405, in this example, 4, is compared against the current nomenclature rule 410 of each of the nomenclature arrays 210.

The comparison of the individual digit 405 with the current nomenclature rule 410 results in an element match status 415 for each nomenclature array 210. The element match status indicates full, partial, dot, or invalid match for each comparison. The match status is determined based on a value returned from each current nomenclature rule 410 as well as positional information such as whether there are further nomenclature rules 220 in the nomenclature array 220 remaining to match.

In this example, the individual digit 405 fails to match the first current nomenclature rule 410, because the first current nomenclature rule 410 requires a 1 digit in order to match. Thus, the element match status 415 for the first current nomenclature rule 410 is an invalid match. Moving to the second current nomenclature rule 410, the individual digit 4 is a match because the numeral 4 falls within the range [2-9] as required by the second current nomenclature rule 410. Because the second nomenclature array 220 has more elements that require matching, the element match status 415 for the second nomenclature array 210 is a partial match. If, for example, the second nomenclature array 220 did not have more elements, then the element match status 415 would have been a full match. The process of comparing the individual digit 405 with current nomenclature rules 410 continues in this manner for each of the remaining current nomenclature rule 410 items. FIG. 4A illustrates an element match status 415 for each current nomenclature rule 410.

A match status 420 is the result of the combination of all element match status 415 items. The match status 420 is used to indicate the overall or cumulative match status of the dial string 150 with the dial plan FSM 160. If any of the element match status 415 items are a full match, then the match status 420 for full match is set. Likewise, if any of the element match status 415 items are a partial match or a dot match, then the match status 420 for partial match or dot match are set, respectively. The match status 420 for the first individual digit 405 is no full match, partial match, and no dot match.

Additionally, in this example the element match status 415 for nomenclature arrays 210 one, three, four, and six are calculated to be invalid matches for the individual digit 405. As mentioned above, nomenclature arrays 210 that are determined to be an invalid match are removed from the Dial plan FSM 160. Thus, nomenclature arrays 210 one, three, four, and six may be removed from the dial plan FSM 160. In this example, FIG. 2F illustrates the dial plan FSM 160 before the elements are removed, and FIG. 2G illustrates the dial plan FSM 160 with null elements 255 replacing the removed nomenclature arrays 210.

Figure 2G:
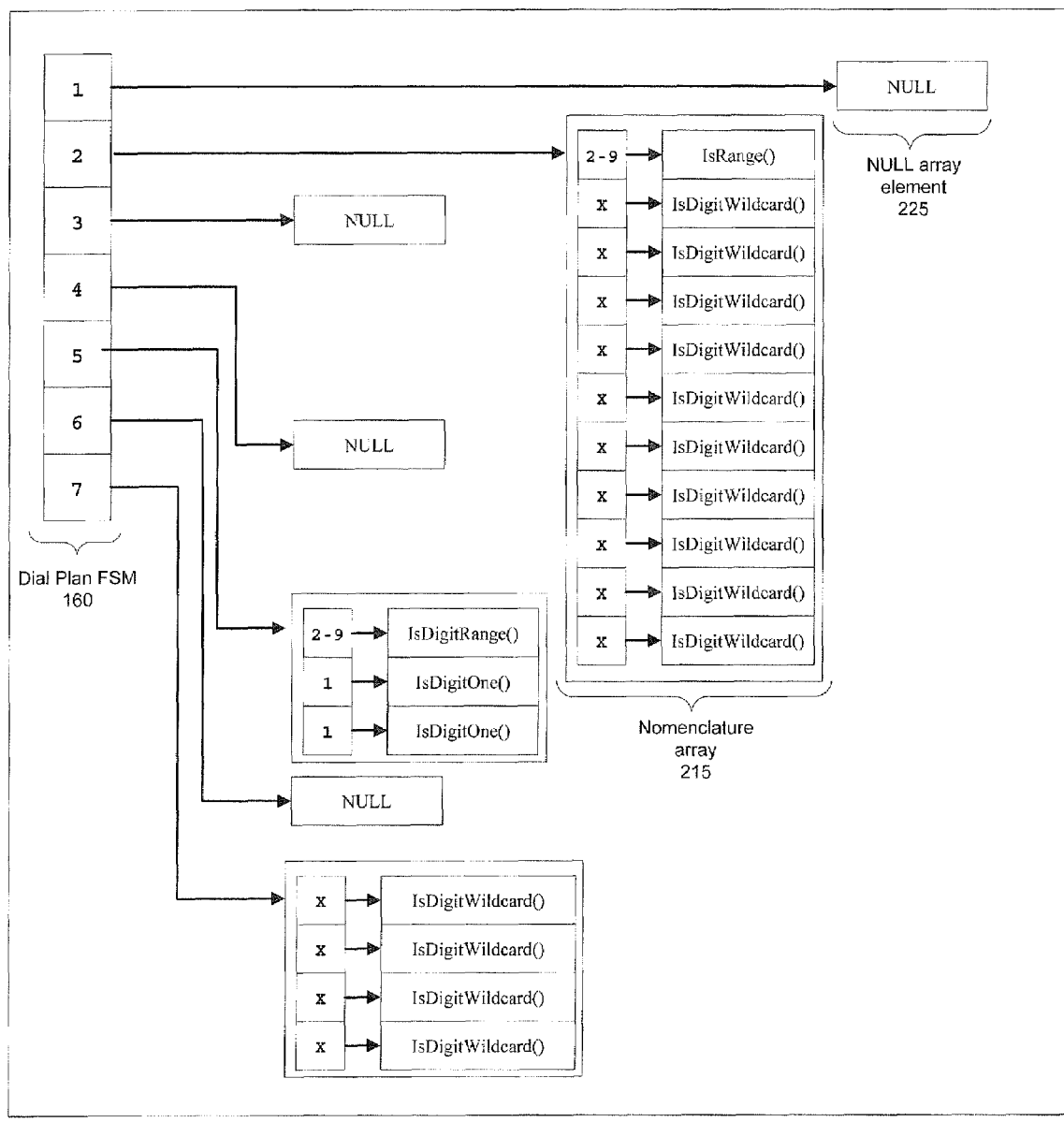
FIG. 2G illustrates an exemplary dial plan finite state machine including NULL array elements.

FIG. 4B illustrates an example evaluation of the second individual digit 405 of a dial string 150, using the updated dial plan FSM 160 as illustrated in FIG. 2G. In this example, each current nomenclature rule 410 corresponds to the second nomenclature rule 220 in each remaining nomenclature array 215. Additionally, nomenclature rules 210 that have been deemed invalid for the first individual digit 405 are no longer compared for the second individual digit 405. These nomenclature rules are represented by a NULL array element 225 in FIG. 2G, and as a NULL current nomenclature rule 410 in FIG. 4B.

Similar to the comparison for the first individual digit in FIG. 4A, the second individual digit 405 of dial string 150, in this example 1, is compared against each current nomenclature rule 410. The individual digit 405 of 1 matches the IsDigitWildcard( ) nomenclature rule for the second and seventh current nomenclature rules 410. The individual digit 405 also matches the IsDigitOne( ) current nomenclature rule 410 of nomenclature array five. As each of these nomenclature arrays 215 contain additional nomenclature rules 220, each of these current nomenclature rules 410 may be a partial match. The partial match status is indicated in the element match status 415 and thus in the match status 420.

In this way, the evaluation of each successive individual digit 405 results either in fully matching at least one nomenclature array 210 of the dial plan FSM 160, or failing to match any of the nomenclature arrays 210 of the dial plan FSM 160. Moreover, once an individual digit 405 has been evaluated, that individual digit 405 is not re-evaluated as successive individual digits are added to the dial string 150.

FIG. 4C illustrates the processing of a third individual digit 405 of a dial string 150. In this illustration, the individual digit 405 is a 1, and the dial string 150 now contains the string 411. As described above, the current nomenclature rules 410 are used to calculate the element match status 415. In this case, the fifth current nomenclature rule 410 is a full match, while the second current nomenclature rule 410 and seventh current nomenclature rule 410 are each a partial match. Thus, match status 420 indicates that a full match and a partial match have been found in dial string 150 as dialed.

Because a full match has been found, it has been determined that a valid dial string 150 has been dialed. The valid dial string 150, may now, for example, be sent on through communications network 110 via subscriber line 115 to connect with destination telephone 165.

Figure 5A:
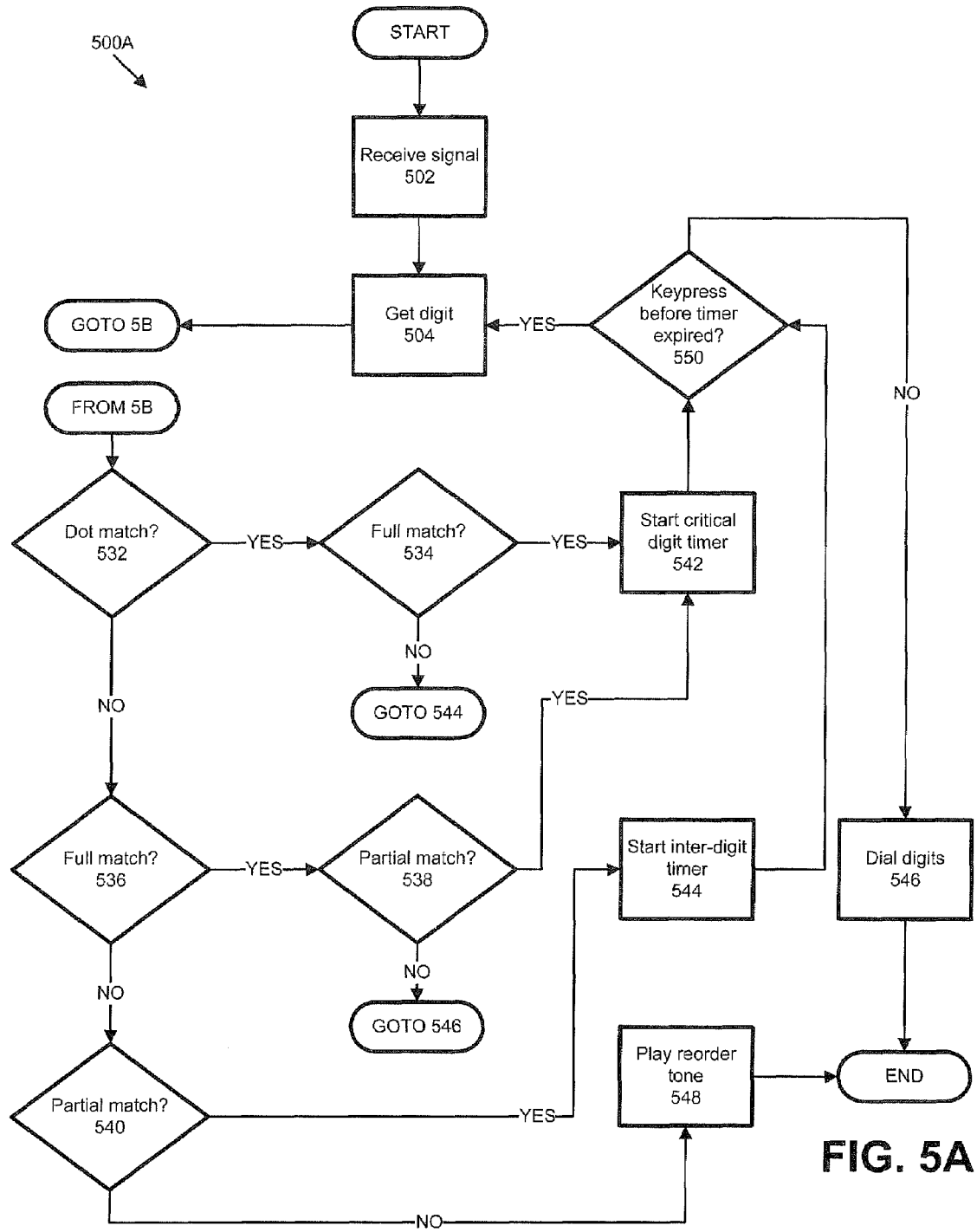
FIG. 5A illustrates an exemplary process for verifying a dialed digit string using a dial plan finite state machine.

FIG. 5A illustrates an exemplary process 500A for verifying a dial string 150 using a Dial plan FSM 160.

In step 502, a signal is received. This informs the system that, for example, the POTS telephone 145 is ready to be dialed. In other examples, no signal is required to indicate a ready status.

Next, in step 504, an individual digit 405 of a dial string 150 is received. This individual digit 405 may be a numeral or other symbol such as the * symbol. The individual digit 405 is added to the end of the dial string 150. In addition, the individual digit 405 is maintained for verification using the Dial plan FSM 160. Next, in FIG. 5B, step 506 is executed.

Figure 5B:
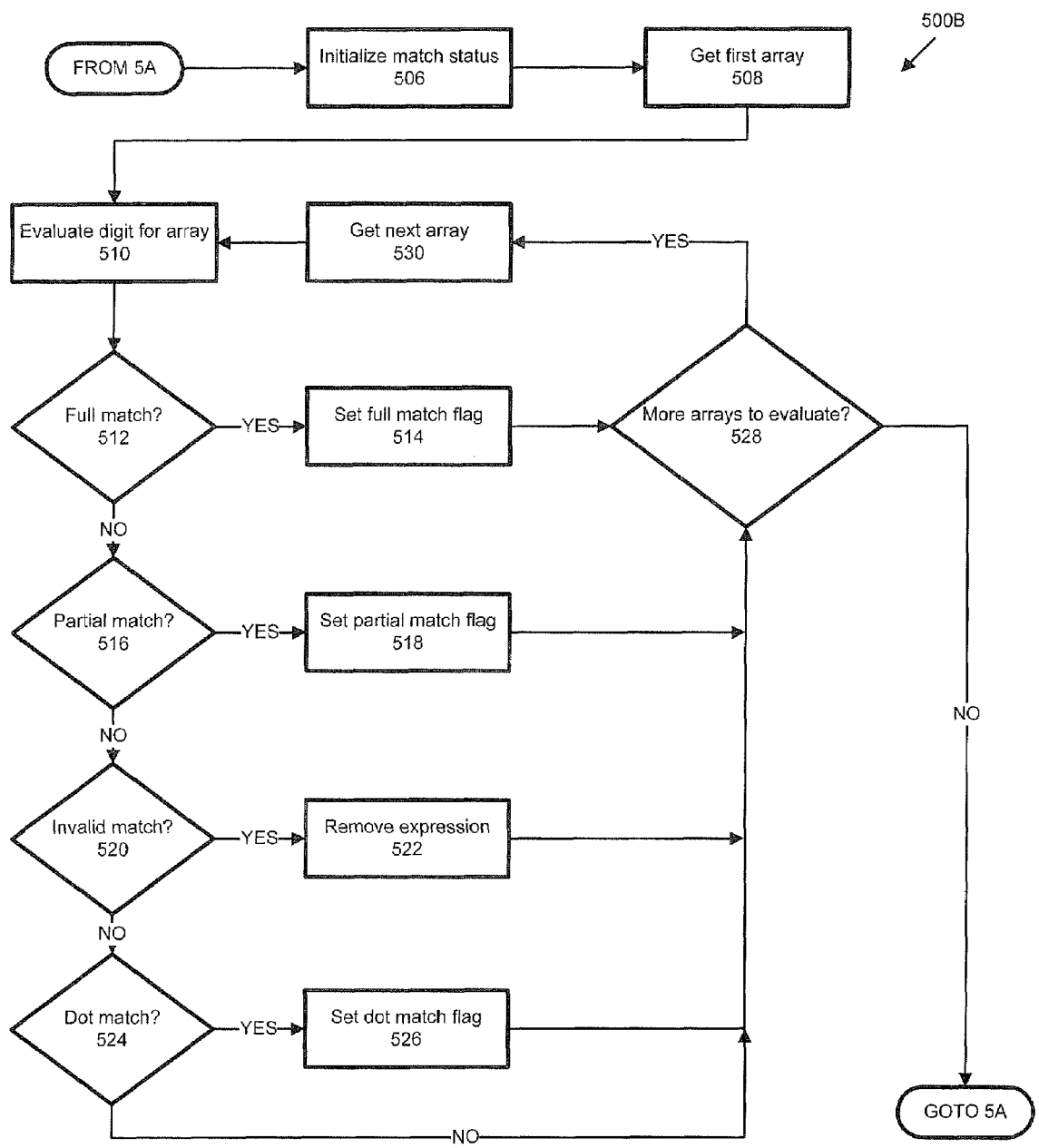
FIG. 5B illustrates an exemplary process for evaluating an individual digit of a dial string for match using a dial plan finite state machine.

FIG. 5B illustrates an exemplary process 500B for evaluating the match status 420 of an individual digit 405 of a dial string 150 using a Dial plan FSM 160.

In step 506, a match status 420 is initialized. As mentioned above, match status 420 indicates what types of match or matches an individual digit 405 of a dial string 150 may have for a dial plan FSM 160. The match status 420 includes flags for full match, partial match, and dot match.

In step 508, a first nomenclature array 210 is retrieved.

Next, in step 510, the individual digit 405 is evaluated for the current nomenclature rule 410 of the nomenclature array 210.

Next, in step 512, it is determined whether the individual digit 405 is a full match for the nomenclature array 210. This may be determined by verifying both that the individual digit 405 matches the current nomenclature rule 410, and also that there are no more elements of the nomenclature array 210 to verify. If the individual digit 405 is a full match, then step 514 is executed next. Otherwise, step 516 is executed next.

In step 514, the full match flag in the match status 420 is set. Step 528 is executed next.

In step 516, it is determined whether the individual digit is a partial match for the nomenclature array 210. This may be determined by verifying that the individual digit 405 matches the current nomenclature rule 410. If the individual digit 405 is a partial match, then step 518 is executed next. Otherwise, step 520 is executed next.

In step 518, the partial match flag in the match status 420 is set. Step 528 is executed next.

In step 520, it is determined whether the individual digit 405 is an invalid match for the current nomenclature rule 410. This may be determined by verifying that the individual digit 405 does not match the current nomenclature rule 410. If the individual digit 405 is an invalid match, then step 522 is executed next. Otherwise, step 524 is executed next.

In step 522, the nomenclature array 210 is removed from consideration. As mentioned above in the example of FIG. 4B, the first, third, fourth, and sixth elements of the dial plan FSM 160 are examples of nomenclature arrays 210 that have been removed from consideration. FIG. 2G illustrates an exemplary dial plan finite state machine including NULL array elements. Step 528 is executed next.

In step 524, it is determined whether the individual digit is a dot match for the nomenclature array 210. This may be determined for example, by verifying that the dial string 155 includes zero or more matches of the nomenclature rule 220 previous to the current nomenclature rule 410. If the individual digit 405 is a dot match, then step 526 is executed next. Otherwise, step 528 is executed next.

In step 526, the dot match flag in the match status 420 is set. Step 528 is executed next.

In step 528, it is determined whether there are more nomenclature arrays 210 remaining to be evaluated. If more nomenclature arrays 210 remain, then step 530 is executed. Otherwise, the match status 420 of individual digit 405 has been fully evaluated, and process 500B ends. Next, step 532 of process 500A in FIG. 5A is executed.

In step 530, the next array element is retrieved. Next, step 510 is executed.

Once the process of FIG. 5B has been executed and the match status 420 has been calculated for the individual digit 405, it may now be decided what action to take based on the match status 420.

In FIG. 5A, step 532, it is determined whether the dot match flag in the match status 420 is set. If yes, then step 534 is executed next. Otherwise, step 536 is executed next.

In step 534, it is determined whether the full match flag in the match status 420 is set. If yes, then both a dot match and a full match have been found, and step 542 is executed next. Otherwise only a dot match and no full match have been found and step 544 is executed next.

In step 542, a critical digit timer is started. A critical digit timer is a short-duration timer (e.g. typically about 0-4 seconds, but may be shorter or longer) started once a full match is found. When the critical digit timer elapses without additional digits being dialed, dial string 150 is then dialed out. Step 550 is executed next.

In step 550 it is determined if the critical digit timer has in fact elapsed, or whether an additional digit was dialed before the critical digit timer elapsed. If another digit was dialed, then step 504 is executed next. Otherwise, step 546 is executed next.

In step 546 the digits of the dial string 150 are dialed out. Then, the process 500A ends.

In step 544, an inter-digit timer is started. An inter-digit timer is a longer-duration timer (e.g. typically about 4-10 seconds) started when a partial match or dot match, but not a full match is found. The inter-digit timer may be of shorter or longer duration, but in any event it is typically as long as or longer than the critical digit timer. As with a critical digit timer, step 550 is executed next, and similarly, if the inter-digit timer elapses before an additional digit is dialed then the dial string 150 is dialed out as discussed above in step 546.

In step 536, it is determined whether the full match flag in the match status 420 is set. If yes, then step 538 is executed next. Otherwise, step 540 is executed next.

In step 538, it is determined whether the partial match flag in the match status 420 is set. If yes, then both a full match and a partial match have been found, and therefore step 542 is executed next to start the critical digit timer. If no, then only a full match and no partial match has been found, and therefore step 546 may be executed next to dial out the dial string 150 immediately.

In step 540, it is determined if the partial match flag in the match status 420 is set. If yes, then more digits are required to get a full match so therefore step 544 is executed next, starting the inter-digit timer. However, if not even a partial match in the match status 420 is set, then the dial string 150 as dialed will never match the dial plan 155. Therefore, step 548 is executed next.

In step 548 a reorder tone is played. A reorder tone indicates that the dial string 150 as dialed is invalid. Here, process 500A ends. In other examples, for example the dial string 150 may be cleared and step 504 executed next, allowing another dial string 150 to be input.

CONCLUSION

With regard to the processes, systems, methods, heuristics, etc. described herein, it should be understood that, although the steps of such processes, etc, have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a,", "the," "said," etc. should be read to recite one or more of the indicated elements unless a claim recites an explicit limitation to the contrary.

What is claimed is:

1. A method, comprising the following steps:
   i) receiving a dial plan;
   ii) parsing the dial plan into a plurality of expressions each including at least one expression element;
   iii) identifying a rule associated with each expression element of each of the plurality of expressions;
   iv) adding the identified rule associated with each expression element of each of the plurality of expressions to an array of a finite state machine;
   v) receiving an n-th digit input of a given dial string, where n=1 corresponds to an initial digit input of the given dial string;
   vi) determining, for each of those of the plurality of expressions that are available for consideration, a match status from among a plurality of possible match statuses by applying the rule associated with an n-th expression element of the respective expression to the n-th digit input;
   vii) selectively removing one or more of the plurality of expressions from availability for consideration based on the match status determined for the respective expression;
   viii) incrementing n; and
   ix) repeatedly performing steps v through viii until the determined match status of one of the plurality of expressions indicates a full match or none of the plurality of expressions is available for consideration.

2. The method of claim 1, wherein the plurality of possible match statuses comprise a full match status, a partial match status, a dot match status, and an invalid match status.

3. The method of claim 2, wherein the match status of a given expression of those of the plurality of expressions that are available for consideration is determined to be the invalid match status when the n-th digit input fails to satisfy the rule associated with the n-th expression element of the given expression.

4. The method of claim 2, wherein the match status of a given expression of those of the plurality of expressions that are available for consideration is determined to be the partial match status when the n-th digit input satisfies the rule associated with the n-th expression element of the given expression and when there remain additional expression elements of the given expression whose associated rule has yet to be applied with respect to the given dial string.

5. The method of claim 2, wherein the match status of a given expression of those of the plurality of expressions that are available for consideration is determined to be the full match status when the n-th digit input satisfies the rule associated with the n-th expression element of the given expression and when there remain no additional expression elements of the given expression whose associated rule has yet to be applied with respect to the given dial string.

6. A system, comprising:
   a processing device connected to at least one communications network and configured to:
      maintain a plurality of input requirements each including at least one matching requirement;
      receive a given input string; and
      determine whether the given input string matches one of the plurality of input requirements by performing the steps of:
         i) receiving an n-th input of the given input string, where n=1 corresponds to an initial input of the given input string;
         ii) determining, for each of those of the plurality of input requirements that are available for consideration, a match result indicating whether the n-th input matches an n-th matching requirement of the respective input requirement;
         iii) reporting a match status for each of those of the plurality of input requirements that are available for consideration based on the match result for the respective input requirement;
         iv) selectively removing one or more of the plurality of input requirements from availability for consideration based on the match result of the respective input requirement;
         v) incrementing n; and
         vi) repeatedly performing steps i through v until the match status of one of the plurality of input requirements indicates a full match or none of the plurality of input requirements is available for consideration.

7. The system of claim 6, wherein the plurality of input requirements each describes a format for valid device identifiers on the at least one communications network, and the match status reported for each of the plurality of input requirements indicates whether the input string corresponds to the valid device identifier described by the respective input requirement.

8. The system of claim 7, further comprising:
an input device connected to the processing device, wherein the input device is configured to receive input and send the given input stream to the processing device.

9. The system of claim 8, wherein the processing device is further configured to selectively send a signal to the input device based on the match status, and the input device is further configured to selectively receive the signal.

10. The system of claim 9, wherein the processing device is further configured to selectively send data corresponding to the given input stream to the at least one communications network, based on the match status.

11. The system of claim 10, wherein the at least one communications network selectively connects the processing device to the device identifier indicated by the given input stream.

12. The system of claim 11, wherein the given input string is a dial string, the plurality of input requirements are each an expression of a dial plan, and the at least one communications network is a telephone communications network.

13. The system of claim 12, wherein the input device is a telephone.

14. A system, comprising:
a processing device connected to at least one communications network and configured to:
 receive a master input requirement plan;
 parse the master input requirement plan into a plurality of input requirements each including at least one matching requirement;
 identify and store a rule associated with each matching requirement of each of the plurality of input requirements;
 receive a given input string; and
 determine whether the given input string matches one of the plurality of input requirements by performing the steps of:
  i) receiving an n-th input of the given input string, where n=1 corresponds to an initial input of the given input string;
  ii) determining, for each of those of the plurality of input requirements that are available for consideration, a match result indicating whether the n-th input matches an n-th matching requirement of the respective input requirement;
  iii) reporting a match status for each of those of the plurality of input requirements that are available for consideration based on the match result for the respective input requirement;
  iv) selectively removing one or more of the plurality of input requirements from availability for consideration based on the match result of the respective input requirement;
  v) incrementing n; and
  vi) repeatedly performing steps i through v until the match status of one of the plurality of input requirements indicates a full match or none of the plurality of input requirements is available for consideration.

15. The system of claim 14, wherein the stored rules are indexed by at least one of input requirement and matching requirement.

16. A system, comprising:
a processing device connected to at least one communications network and configured to:
 receive a master input requirement plan;
 parse the master input requirement plan into a plurality of input requirements each including at least one matching requirement;
 identify a rule associated with each matching requirement of each of the plurality of input requirements;
 maintain the identified rules indexed by at least one of input requirement and matching requirement;
 receive a given input string; and
 determine whether the given input string matches one of the plurality of input requirements by performing the steps of:
  i) receiving an n-th input of the given input string, where n=1 corresponds to an initial input of the given input string;
  ii) determining, for each of those of the plurality of input requirements that are available for consideration, a match result indicating whether the n-th input matches an n-th matching requirement of the respective input requirement;
  iii) reporting a match status for each of those of the plurality of input requirements that are available for consideration based on the match result for the respective input requirement;
  iv) selectively removing one or more of the plurality of input requirements from availability for consideration based on the match result of the respective input requirement;
  v) incrementing n; and
  vi) repeatedly performing steps i through v until the match status of one of the plurality of input requirements indicates a full match or none of the plurality of input requirements is available for consideration; and
an input device connected to the processing device, wherein the input device is configured to receive input and send the given input string to the processing device.

17. The system of claim 16, wherein the match status indicates whether the given input string corresponds to a valid device identifier format on the at least one communications network.

18. The system of claim 17, wherein the given input string is a dial string, the master input requirement is a dial plan, and the at least one communications network is a telephone communications network.

19. The system of claim 18, wherein the input device is a telephone.

20. A method, comprising:
maintaining a plurality of input requirements including at least one matching requirement;
receiving a given input string; and
determining whether the given input string matches one of the plurality of input requirements by performing the steps of:
 i) receiving an n-th input of the given input string, where n=1 corresponds to an initial input of the given input string;
 ii) determining, for each of those of the plurality of input requirements that are available for consideration, a match result indicating whether the n-th input matches an n-th matching requirement of the respective input requirement;
 iii) reporting a match status for each of those of the plurality of input requirements that are available for consideration based on the match result for the respective input requirement;

iv) selectively removing one or more of the plurality of input requirements from availability for consideration based on the match result of the respective input requirement;
v) incrementing n; and
vi) repeatedly performing steps i through v until the match status of one of the plurality of input requirements indicates a full match or none of the plurality of input requirements is available for consideration.

21. The method of claim 20, wherein the plurality of input requirements describe at least one format for valid device identifiers on at least one communications network, and the match status indicates whether the given input string corresponds to a valid device identifier format on the at least one communications network.

22. The method of claim 21, further comprising selectively connecting to a device associated by the device identifier indicated by the given input string.

\* \* \* \* \*